(12) United States Patent
Hegge et al.

(10) Patent No.: US 10,877,172 B2
(45) Date of Patent: Dec. 29, 2020

(54) PREDICTION AND SUBTRACTION OF MULTIPLE DIFFRACTIONS

(71) Applicant: PGS Geophysical AS, Oslo (NO)

(72) Inventors: Robertus Franciscus Hegge, Leiden (NL); Paolo Terenghi, Weybridge (GB); Andreas Klaedtke, Weybridge (GB); Amr Ahmed Mahmoud Ibrahim, Weybridge (GB)

(73) Assignee: PGS Geophysical AS, Oslo (NO)

( * ) Notice: Subject to any disclaimer, the term of this patent is extended or adjusted under 35 U.S.C. 154(b) by 27 days.

(21) Appl. No.: 16/394,444

(22) Filed: Apr. 25, 2019

(65) Prior Publication Data

US 2019/0250293 A1    Aug. 15, 2019

Related U.S. Application Data (63) Continuation of application No. 15/191,887, filed on Jun. 24, 2016, now Pat. No. 10,310,115.
(Continued)

(51) Int. Cl.
*G01V 1/30* (2006.01)
*G01V 1/38* (2006.01)
(Continued)

(52) U.S. Cl.
CPC ............... *G01V 1/30* (2013.01); *G01V 1/325* (2013.01); *G01V 1/364* (2013.01); *G01V 1/38* (2013.01); *G01V 2210/121* (2013.01); *G01V 2210/1423* (2013.01); *G01V 2210/46* (2013.01); *G01V 2210/48* (2013.01); *G01V 2210/56* (2013.01); *G01V 2210/675* (2013.01)

(58) Field of Classification Search
CPC .......... G01V 1/325; G01V 1/364; G01V 1/38; G01V 2210/121; G01V 2210/1423; G01V 2210/46; G01V 2210/48; G01V 2210/56; G01V 2210/675; G01V 1/30
USPC .......................................................... 702/17
See application file for complete search history.

(56) References Cited

U.S. PATENT DOCUMENTS

| | | | |
|---|---|---|---|
| 2015/0185342 A1* | 7/2015 | van Groenestijn | .... G01V 1/364 702/14 |
| 2015/0331123 A1* | 11/2015 | Guigne | .................... G01V 1/28 702/16 |

OTHER PUBLICATIONS

Alvarez et al., Attenuation of Diffracted Multiples With an Apex-Shifted Tangent-Squared Radon Transform in Image Space, Jul./Dec. 2006, Earth Sci. Res. J. vol. 10, No. 2, Bogotá, 13 pp. (Year: 2006).*

(Continued)

*Primary Examiner* — Toan M Le
*Assistant Examiner* — Xiuqin Sun (57) ABSTRACT

Prediction and subtraction of multiple diffractions may include transforming previously acquired seismic data from a time-space domain to a transformed domain using a dictionary of compressive basis functions and separating, within the transformed previously acquired seismic data, a first portion and a second portion of the transformed previously acquired seismic data. Prediction and subtraction of multiple diffractions may also include predicting a plurality of multiple diffractions based on the separated first and second portions and adaptively subtracting the predicted multiple diffractions from the previously acquired seismic data. Prediction and subtraction of multiple diffractions may also include inverse transforming a particular seismic data set from the transformed domain to the time-space domain.

15 Claims, 8 Drawing Sheets

Related U.S. Application Data (60) Provisional application No. 62/195,459, filed on Jul. 22, 2015.

(51) Int. Cl.
  *G01V 1/36* (2006.01)
  *G01V 1/32* (2006.01)

(56) References Cited

OTHER PUBLICATIONS

Hargreaves, et al., "Multiple Diffractions and Coherent Noise in Marine Seismic Data", (4 pgs) http://www.cgg.com/technicalDocuments/0157.pdf, 2002.
Keggin, et al., "Attenuation of Multiple Diffractions by Multi-azimuth Streamer Acquisition", EAGE 64th Conference & Exhibition—Florence, Italy, May 27-30, 2002 (4 pgs) http://www.pgs.com/upload/31041/data.pdf.
Hargreaves, et al., "Multiple Attenuation Using an Apex-Shifted Radon Transform"; Society of Exploration Geophysicists, 2003 SEG Annual Meeting, Oct. 26-31, 2003 (5 pgs).
Sahay, et al., "Dynamic Green's Function for Homogeneous and isotropic porous media"; Geophysical Journal International, vol. 147, Issue 3, Dec. 1, 2001 (35 pgs).
Alvarez, et al., "Attenuation of Diffracted Multiples with an Apex-Shifted Tangent-Squared Radon Transform in Image Space"; Earth Science Res. Journal. vol. 10, No. 2, Jul./Dec. 2006 (13 pgs).

\* cited by examiner

PREDICTION AND SUBTRACTION OF MULTIPLE DIFFRACTIONS

CROSS-REFERENCE TO RELATED APPLICATIONS

This application is a continuation of U.S. Non-Provisional application Ser. No. 15/191,887, filed Jun. 24, 2016 and published as U.S. Publication No. 2017/0023686 A1 on Jan. 26, 2017, which claims priority to U.S. Provisional Application 62/195,459, filed Jul. 22, 2015, which is incorporated by reference.

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are helpful for quantitative seismic interpretation and improved reservoir monitoring. For a typical marine seismic survey, a marine survey vessel tows one or more seismic sources below the sea surface and over a subterranean formation to be surveyed for mineral deposits. Seismic receivers may be located on or near the seafloor, on one or more cables, also known as streamers, towed by the marine survey vessel, or on one or more cables towed by another vessel. The marine survey vessel typically contains marine seismic survey equipment, such as navigation control, seismic source control, seismic receiver control, and recording equipment. The seismic source control may cause the one or more seismic sources, which may be air guns, marine vibrators, etc., to produce acoustic impulses at selected times. Each acoustic impulse generates a sound wave called a wavefield that travels down through the water and into the subterranean formation. At each interface between different types of rock, a portion of the wavefield may be refracted, and another portion may be reflected, which may include some scattering, back toward the body of water to propagate toward the sea surface. The seismic receivers thereby measure a wavefield that was initiated by the actuation of the seismic source.

DETAILED DESCRIPTION

The present disclosure is related to prediction and subtraction of multiple diffractions. For example, multiple diffractions may be detected by separating transformed seismic data, predicting multiple diffractions based on the separated transformed seismic data, subtracting the multiple diffractions from the transformed seismic data and inverse transforming the transformed seismic data. In some instances, the transformed seismic data is transformed from a time-space domain to the transformed domain and inverse transformed back to the time-space domain.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The terms "comprise," "include," and derivations thereof, mean "comprising" or "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein may be added, exchanged, and/or eliminated so as to provide a plurality of additional embodiments of the present disclosure. In addition, as will be appreciated, the proportion and the relative scale of the elements provided in the figures are intended to illustrate certain embodiments of the present invention, and should not be taken in a limiting sense.

Figure 1:
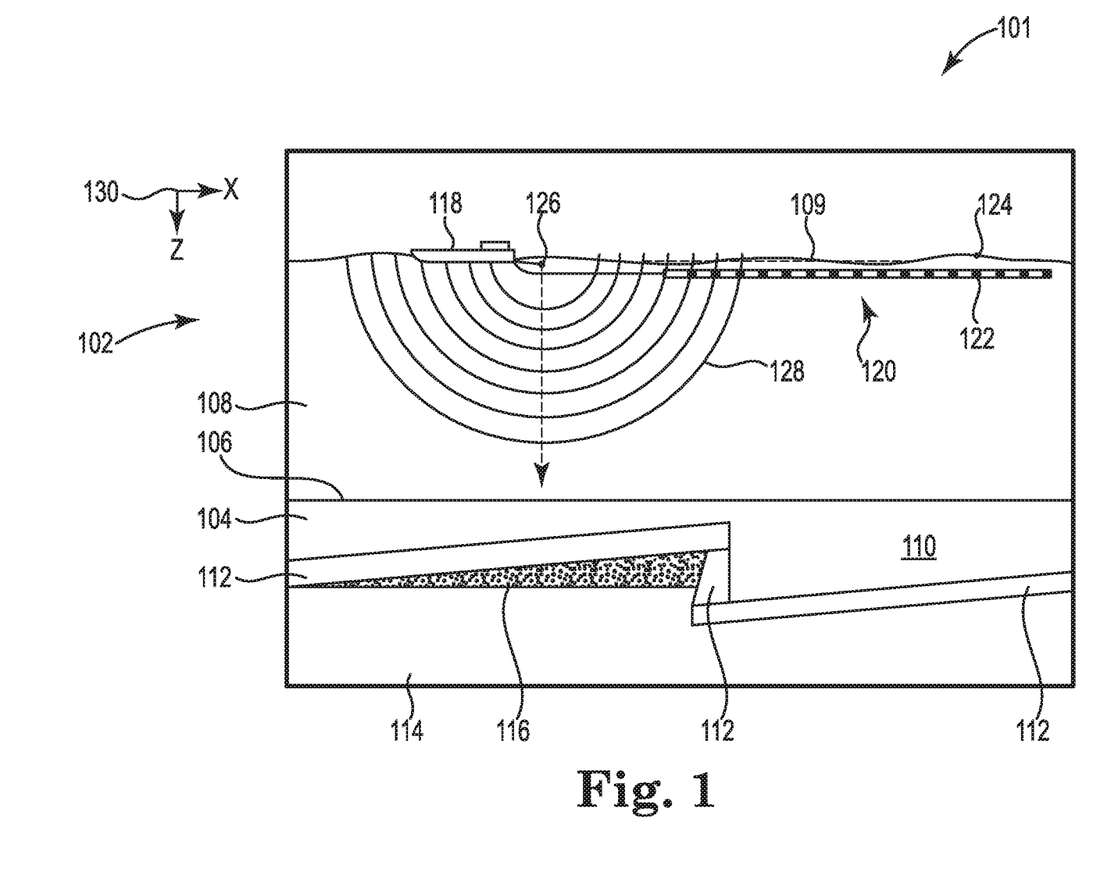
FIG. 1 illustrates an elevation or xz-plane view of marine seismic surveying in which acoustic wavefronts are emitted by a seismic source for recording by seismic receivers.

FIG. 1 illustrates an elevation or xz-plane 101 view of marine seismic surveying in which acoustic wavefronts are emitted by a seismic source for detecting and/or recording by seismic receivers for processing and analysis in order to help characterize the structures and distributions of features and materials underlying the surface 106 of the subterranean formation. FIG. 1 shows a domain volume 102 comprising a subsurface volume 104 of sediment and rock below the surface 106 of the subterranean formation that, in turn, underlies a fluid volume 108 of water having a sea surface 109 such as in an ocean, an inlet or bay, or a large freshwater lake. The domain volume 102 shown in FIG. 1 represents an example experimental domain for a class of marine seismic surveys. FIG. 1 illustrates a first sediment layer 110, an uplifted rock layer 112, second, underlying rock layer 114, and hydrocarbon-saturated layer 116.

FIG. 1 shows an example of a marine survey vessel 118 equipped to carry out marine seismic surveys. In particular, the marine survey vessel 118 may tow one or more cables 120 (shown as one cable for ease of illustration) generally located near or below the sea surface 109. The cables 120 may be long cables containing power and data-transmission lines to which seismic receivers may be connected. In one type of marine seismic survey, each seismic receiver, such as the seismic receiver represented by the shaded disk 122 in FIG. 1, comprises two or more seismic receivers including a sensor detecting particle motion, displacement velocity or acceleration, and a sensor that detects variations in pressure.

The cables 120 and the marine survey vessel 118 may include sensing electronics and data-processing facilities that allow seismic receiver readings to be correlated with absolute positions on the sea surface and absolute three-dimensional (3D) positions with respect to a 3D coordinate system. In FIG. 1, the seismic receivers along the cables 120 are shown to lie below the sea surface 109, with the seismic receiver positions correlated with overlying surface positions, such as a surface position 124 correlated with the position of seismic receiver 122. The marine survey vessel 118 may also tow one or more seismic sources 126 that produce acoustic impulses as the marine survey vessel 118 and cables 120 move along the sea surface 109. An expanding, spherical acoustic wavefront is illustrated at 128, as will be discussed further herein with respect to FIG. 2, and is represented by circular arcs of increasing radius centered at seismic sources 126. Seismic sources 126 and/or seismic receivers 122 may also be towed by other vessels, or may be otherwise disposed in fluid volume 108. For example, seismic receivers may be located in ocean bottom cables or nodes fixed at or near the surface 106 of the subterranean formation, and seismic sources 126 may also be disposed in a nearly-fixed or fixed configuration. For the sake of efficiency, illustrations and descriptions herein show seismic receivers located within cables, but it should be understood that references to seismic receivers located in a "cable" or "streamer" should be read to refer equally to receivers located in a towed streamer, an ocean bottom seismic receiver cable, and/or an array of nodes.

Figure 2:
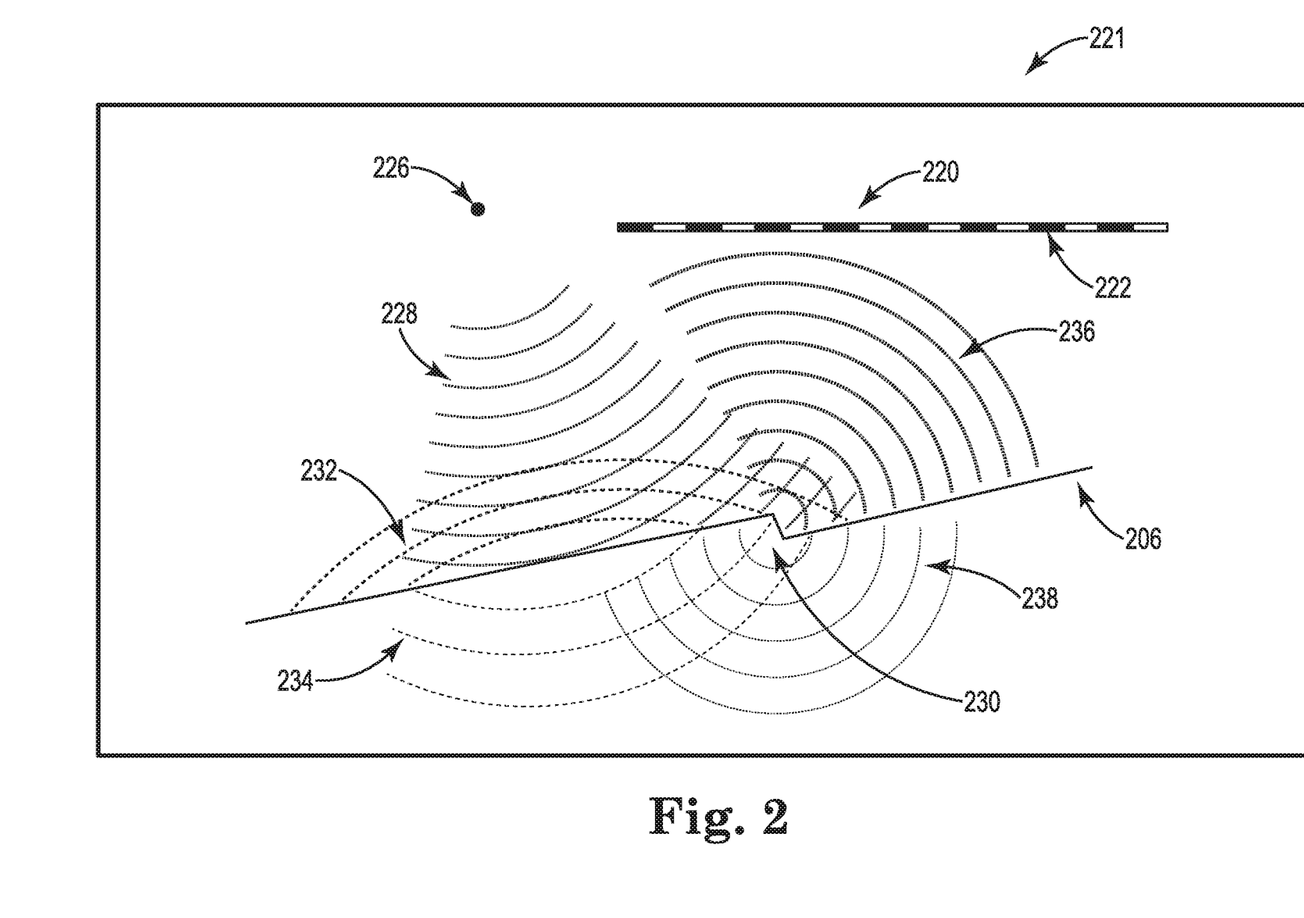
FIG. 2 illustrates a diagram associated with prediction and subtraction of multiple diffractions.

FIG. 2 illustrates a diagram 221 associated with prediction and subtraction of multiple diffractions. As noted above, FIG. 2 shows an expanding, spherical acoustic wavefront 228, represented by circular arcs of increasing radius centered at the seismic source 226, such as wavefront 228, following an acoustic impulse emitted by the seismic source 226. The acoustic wavefront 228 is shown in a vertical plane cross section. The outward and downward expanding acoustic wavefront 228 may eventually reach the surface 206 of the subterranean formation, at which point the outward and downward expanding acoustic wavefront 228 may partially reflect 232 from the surface of the subterranean formation and may partially transmit downward into the subsurface volume, becoming wavefronts 234 within the subsurface volume. The expanding wavefront 228 may also diffract and/or scatter at irregularities 230 present on the surface 206 of the subterranean formation, thereby effectively initiating the expansion of a new spherical wavefront represented by circular arcs 236 and 238. For example, wavefront 228 hits irregularities 230 initiating upgoing wavefront portions 236 and downgoing wavefront portions 238. The downgoing portions 234 and 238 of expanding wavefronts may continue to propagate outward and downward to reach the surface of deeper subterranean formations and similarly upward reflect, downward transmit, or diffract in all directions.

Some of the wavefronts, carrying the information utilized in the seismic imaging process, may eventually return to the sea surface and may be detected by the seismic receivers 222 located on the cables 220 which can be located at or near the sea surface. In at least one embodiment, the sea surface may be surface 109 illustrated in FIG. 1. The multiplicity of seismic wavefronts resulting from the interaction between the source wavefront and the subterranean interfaces between distinct formations may be referred to as a seismic wavefield. Individual wavefronts constituting the seismic wavefield may also be referred to as seismic events. The signals recorded by the seismic receivers at a plurality of spatial locations and sampled at a plurality of temporal delays with respect to the ignition of the seismic source may be referred to as seismic data.

Seismic events are classified based on their propagation history inside the subsurface. Primaries are seismic events whose propagation history includes exactly one upward reflection or a diffraction (scattering) episode in the subsurface. Multiples are seismic events characterized by at least two upward reflections or diffractions in the subsurface, separated by at least one downward reflection at the sea surface. Multiple reflections (or reflected multiples) consist of events characterized by at least one subsurface upward reflection, followed by a downward reflection at the sea surface, followed by at least another upward reflection in the subsurface. Multiple diffractions (or diffracted multiples) may consist of events characterized by at least one subsurface diffraction, followed by a downward reflection at the sea surface, followed by at least another diffraction in the subsurface. Multiple diffractions also may include events characterized, for example, by an upward subsurface reflection, followed by a downward reflection at the sea surface, followed by a subsurface diffraction. Similarly, multiple diffractions may include events characterized by a subsurface diffraction, followed by a downward reflection at the sea surface, followed by an upward subsurface reflection.

Multiples may be considered noise, and it may be desirable to remove these multiples prior to seismic imaging. However, the removal of multiple diffractions may be challenging due to their steeply dipping, heavily aliased tails, for example. For instance, multiple diffractions may become indistinguishable from one another and/or may display differently in different domains. In contrast, at least one embodiment of the present disclosure provides improved multiple diffraction detection.

In at least one embodiment, a compressive domain transform may be utilized to map seismic data from the time-space domain to a transformed domain where individual points, or a small group of points, may represent the recorded signals associated with a specific event, for example a multiple diffraction, or other events in the time-space domain. As used herein, the time-space domain comprises an analysis of mathematical functions, physical signals, and/or environmental data with respect to time and/or space. The transformed domain, as used herein, comprises a mathematical procedure done in data that converts it from one domain, such as a time or time-space domain, to another domain such as a frequency domain. In at least one embodiment, the compressive transform utilized is an Asymptote and Apex Shifted Hyperbolic Radon Transform (AASHRT). In another embodiment, the compressive transform utilized is based on a dictionary of Green's functions for a homogeneous medium. Dictionaries, as used herein, include a set of signals called atoms describing elementary features and can be locally trained to capture a morphology associated with seismic data.

As used herein, seismic data comprises data associated with a wavefield. For instance, seismic data may include data associated with time, space, and amplitudes of wavefields. Sampled seismic data comprises sampled and/or recorded seismic data. Seismic data may be sampled from a seismic receiver located on a cable, an ocean bottom cable, or a node, among others. Previously acquired seismic data includes seismic data that has already be sampled and/or collected by another means.

In the compressed domain, the events corresponding to specific event-types in the seismic wavefield may become distinguishable. For example, it may become possible to distinguish a predominantly reflective portion of the transformed wavefield from a predominantly diffractive portion of the transformed wavefield. As used herein, predominantly refers to having the most importance or influence. For instance, a predominantly reflective portion may have properties that are not reflective, but the reflective property has a greater importance or influence than the other properties. The predominantly diffractive portion may have properties that are not diffractive, but the diffractive property has a greater importance or influence than the other properties. The two portions may be complementary, so that their sum may amount to the transformed wavefield. The separation may be based on an equivalent source delay parameter of a Green's function based dictionary or on an asymptote shift parameter associated with the AASHRT dictionary. The asymptote shift parameter can include a quantity whose value is selected for particular circumstances and in relation to an asymptote shift. The equivalent source delay parameter can include a quantity whose value is selected for particular circumstances and in relation to a source delay.

The inverse transform of the predominantly diffractive portion of the transformed wavefield may be utilized to obtain an estimate of diffractions in the original seismic data. That estimate may be used in a prediction process, in order to obtain a prediction of the multiple diffractions in the seismic data. As used herein, an inverse transform performs the reverse or opposite of a forward transform. For example, it may reconstruct seismic data which, if forward transformed, would give back the transformed seismic data which is the input to the inverse transform.

In at least one embodiment, the prediction process is a surface-related multiple elimination (SRME) process. SRME is a demultiple tool aimed at removing multiple energy derived from an air/water interface. During SRME, seismic data is used to predict and iteratively subtract a multiple series. It may be, in one embodiment, that the inverse transform allows the output estimate of diffractions in the original seismic data to be interpolated at a denser spacing than the original input seismic data, such that the prediction process may work optimally by avoiding what may be heavily aliased events otherwise. Subsequently, that prediction resulting from the prediction process may be adaptively subtracted from the original seismic data to remove multiple diffractions. As used herein, adaptively subtracting includes making the subtraction process suitable to conditions of the prediction and the original seismic data. Adaptive subtraction is an element used in data-driven multiple-suppression methods to minimize misalignments and amplitude differences between predicted and actual multiples, and may reduce multiple contaminations in a data set after subtraction.

In at least one embodiment, the prediction process may be performed the transformed domain. The inverse transform may be applied to the multiple diffraction prediction, resulting from the prediction process in the transformed domain. The multiple diffraction prediction may then be adaptively subtracted from the initial seismic wavefield in the time-space domain.

In another embodiment, both the prediction process and the adaptive subtraction may be performed in the transformed domain. The inverse transform of seismic data without multiple diffractions to the time-space domain may be utilized.

In the transformed domain, multiple diffractions may become distinguishable from primaries and other types of multiples. In at least one embodiment, the portions of the transformed domain identified as multiple diffractions may be muted, so that an inverse transform applied to the remaining portion of the transformed seismic data may generate seismic data free of multiple diffractions. As used herein, muted seismic data is seismic data with multiple diffractions removed. In another embodiment, the inverse transform may be applied only to the portions of the transformed seismic data identified as multiple diffractions. The resulting estimate of multiple diffractions in the time-space domain may then be subtracted or adaptively subtracted from the initial seismic data.

Compressive transforms may rely on a dictionary that, as used herein, consists of a plurality of basis functions or frames. Measurements of the seismic wavefield may be described as a superposition of those basis functions, each scaled by an appropriate real or complex-valued spectral coefficient. The collection of all spectral coefficients pertaining to all employed basis functions constitutes the transformed domain. As used herein, a dictionary of basis functions includes a collection of Green's functions for the homogeneous medium, and a collection of apex and asymptote shifted hyperbolic functions (AASHRT dictionary). The AASHRT dictionary may perform similarly, but not exactly as the Green's function dictionary.

Within the Green's function dictionary, each basis function may be chosen as the wavefield which would be recorded at the seismic receiver locations r={x, y, z} if an instantaneous point source were fired at time t' at a generic location r'={x', y', z'} of a fictitious homogeneous reference medium characterized by a constant wave-propagation velocity c. Basis functions G may be written as:

$$G(t, r, t', r') = \frac{1}{\|r - r'\|} H(t, r, t', r') = \frac{1}{\|r - r'\|} \delta\left(t - \left(t' + \frac{\|r - r'\|}{c}\right)\right).$$

The hyperbolic term $$H(t, r, t', r') = \delta\left(t - \left(t' + \frac{\|r - r'\|}{c}\right)\right)$$

defines the basis functions used within the AASHRT dictionary. Using a different but equivalent parameterization, the basis functions in the AASHRT dictionary may be defined as:

$$H(t, x, y, z, t', x', y', \tau) = \delta\left(t - \left(t' + \sqrt{\tau^2 + \frac{(x - x')^2 + (y - y')^2}{c^2}}\right)\right)$$

where the parameter $$\tau = \frac{z - z'}{c}$$

represents the temporal location of the hyperbola's apex. Similarly, parameters x' and y' represent the spatial location of the hyperbola's apex. The parameter t', previously introduced as a firing delay parameter for the Green's function dictionary, may be seen as a temporal asymptote shift in the context of the AASHRT dictionary. The firing delay parameter can include a quantity whose value is selected for particular circumstances and in relation to delay in an actuation of a seismic source (also referred to as firing).

For the case of 3D wave propagation, each basis function in the Green's function dictionary and in the AASHRT dictionary may be unambiguously identified by a unique combination of five spectral parameters: t', x', y', z', and c. In the case of two-dimensional (2D) propagation, basis functions may be identified by a unique combination of four spectral parameters: t', x', z', and c. Using the second parameterization, 3D basis functions may be similarly identified by a unique combination of five parameters: t', x', y', τ, and c. Two-dimensional basis functions are defined by unique combinations of four parameters: t', x', τ, and c.

Figure 3:
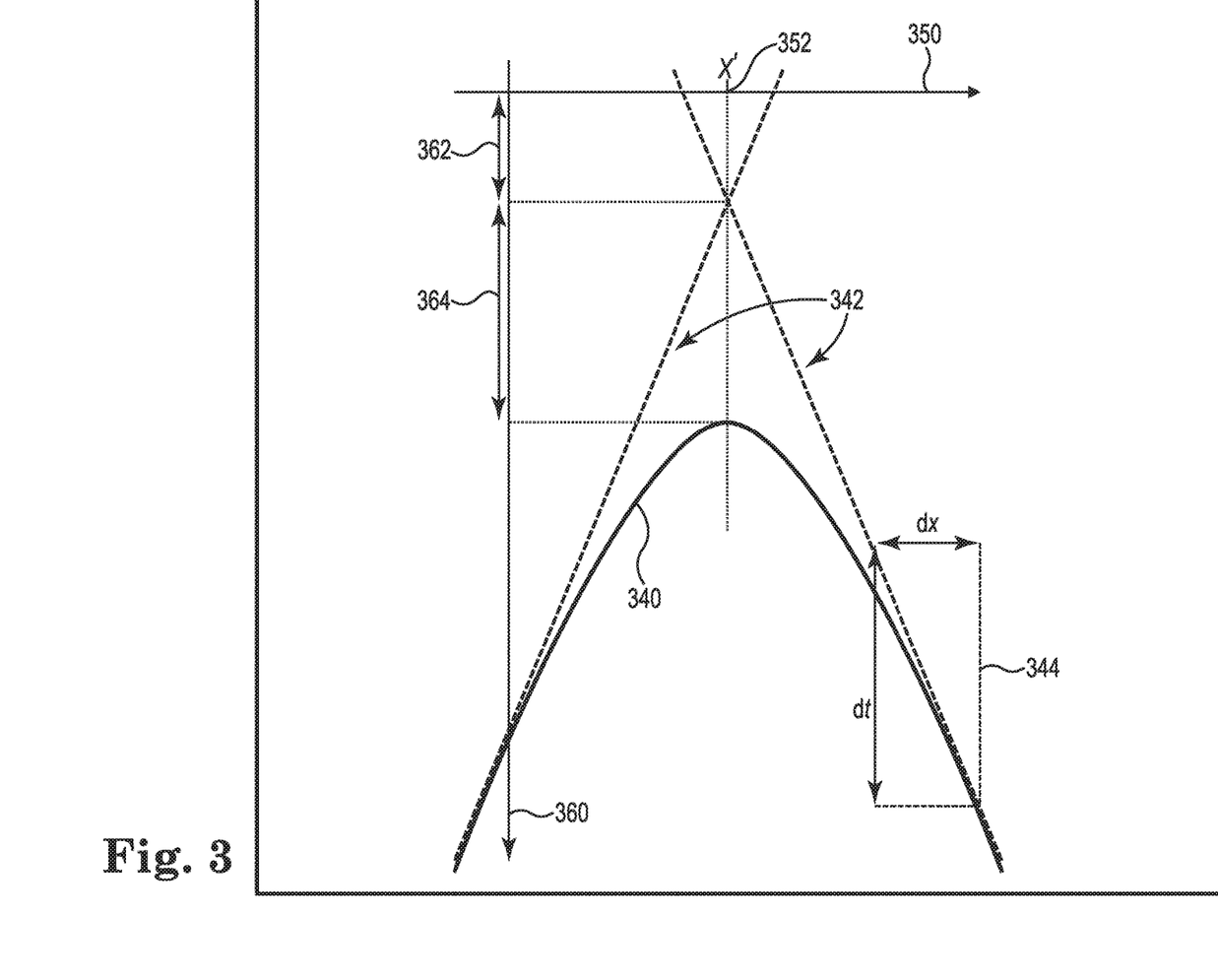
FIG. 3 illustrates a diagram associated with prediction and subtraction of multiple diffractions.

FIG. 3 illustrates a diagram associated with prediction and subtraction of multiple diffractions along a time axis 360 and a space axis 350. For example, FIG. 3 illustrates a diagram associated with representing seismic data in a compressed domain, based on the above-described dictionaries. FIG. 3 is an example 2D diagram, so the apex location is determined by one horizontal coordinate, x'. For example, each hyperbola 340 may be parameterized in terms of apex time τ 364, asymptote shift t' 362 (associated with the intersection of the hyperbola's asymptotes), the location of the hyperbola's apex x' 352, the shape or dip 344 of the asymptotes 342 for large offsets (in meters) and times (in seconds). Asymptote dip may be associated with the ratio 344 between the instantaneous variation of time dt and space dx along the tails of a hyperbola. This ratio may be described as the inverse of a velocity (in meters/seconds) as shown in FIG. 3. In an example 3D representation, the apex location may be described by two horizontal coordinates, x' and y'.

Using either of the two dictionaries L, seismic data in the time-space domain d(t,x,y) may be represented as a superposition of hyperbolic events and mapped to the transformed domain m(t', x', y', z', c) or m(t', x', y', τ, c)

$$d(t, x, y) = \sum_{t', x', y', z', c} Lm(t', x', y', \tau, c)$$

$$= \sum_{x', y', z', c} m\left(\sqrt{\tau^2 + \frac{(x-x')^2 + (y-y')^2}{c^2}}, x', y', t', c\right)$$

Seismic data in the compressed domain $\tilde{m}$ using the adjoint L* of either of the two dictionaries, may be estimated through a summation performed on the seismic data in the time-space domain along hyperbolic trajectories $$\tilde{m}(t', x', y', \tau, v) =$$

$$\sum_{t,x,y} L^* d(t, x, y) = \sum_{x,y} d\left(t' + \sqrt{\tau^2 + \frac{(x-x')^2 + (y-y')^2}{c^2}}, x, y\right).$$

Figure 4:
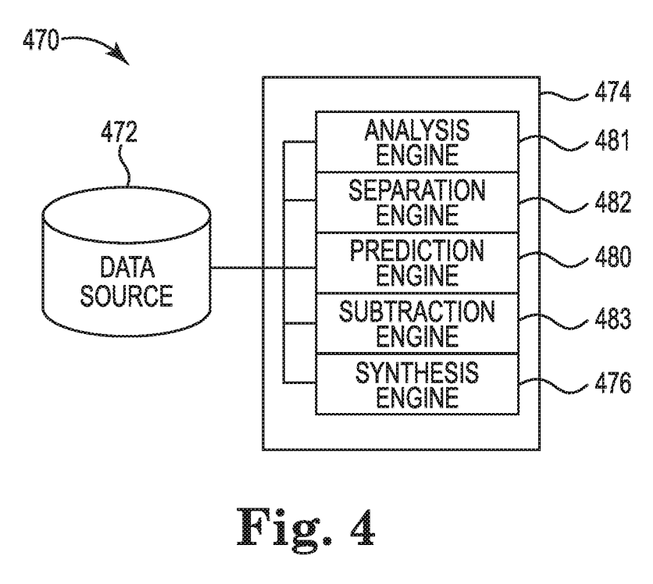
FIG. 4 illustrates a diagram of a system associated with prediction and subtraction of multiple diffractions.
Figure 5:
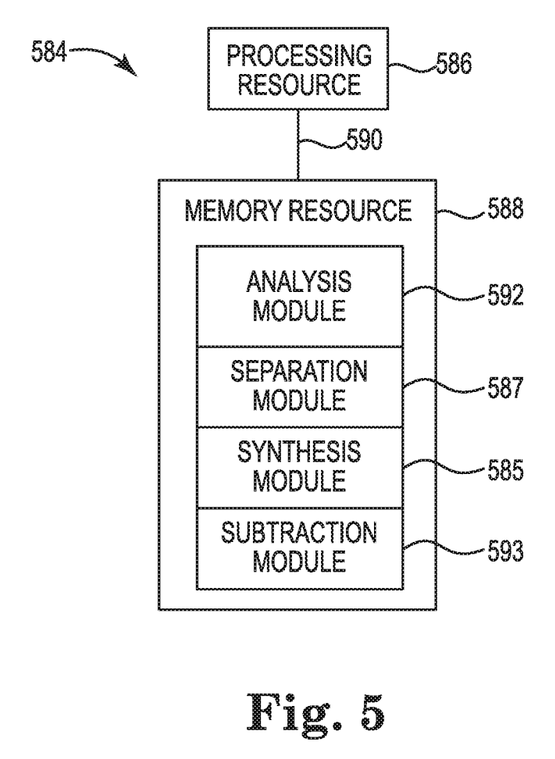
FIG. 5 illustrates a diagram of a machine associated with prediction and subtraction of multiple diffractions.

FIG. 4 illustrates a diagram of a system 470 associated with prediction and subtraction of multiple diffractions. The system 470 may include a data source 472, a subsystem 474, and/or a plurality of engines such as analysis engine 481, separation engine 482, prediction engine 480, subtraction engine 483, and/or synthesis engine 476, and may be in communication with the data source 472 (or data store) via a communication link. The subsystem 474 may include additional or fewer engines than listed to perform the various functions described herein. The system 474 may represent program instructions and/or hardware of a machine such as machine 784. As used herein, an "engine" may include program instructions and/or hardware, but at least includes hardware. Hardware is a physical component of a machine that enables it to perform a function. Examples of hardware may include a processing resource, a memory resource, a logic gate, etc.

The plurality of engines 481, 482, 480, 483, 476 may include a combination of hardware and program instructions that is configured to perform a plurality of functions described herein. The program instructions, such as software, firmware, etc., may be stored in a memory resource such as a machine-readable medium, as well as hard-wired program such as logic. Hard-wired program instructions may be considered as both program instructions and hardware. An analysis engine 481 may include a combination of hardware and program instructions configured to transform previously acquired seismic data from a time-space domain to a transformed domain using a dictionary of compressive basis functions. Transforming the previously acquired seismic data includes changing the form of the previously acquired seismic data from one domain to another. In at least one embodiment, the dictionary of compressive basis functions comprises a transform dictionary composed of AASHRT functions. In another embodiment, the dictionary of compressive basis functions comprises a transform dictionary composed of Green's functions for homogeneous media. A transform dictionary includes functions associated with transforming the previously acquired seismic data.

A separation engine 482 may include a combination of hardware and program instructions configured to separate, within the transformed previously acquired seismic data, a first portion and a second portion of the previously acquired seismic data. Separation can include splitting the previously acquired data into a plurality of portions based on particular characteristics of the previously acquired seismic data. In at least one embodiment, the first portion is associated with multiple diffractions, and the second portion is the remainder of the transformed seismic data. In such an embodiment, synthesis engine 476 (discussed further below) may be configured to inverse transform a remainder of transformed previously acquired seismic data to the time-space domain.

In at least one embodiment, the first portion is a reflective portion, and the second portion is a diffractive portion. The first portion may be a predominantly reflective portion and the second portion may be a predominantly diffractive portion. Separation engine 482 may also separate the reflective portion and the diffractive portion based on a firing delay parameter or an asymptote shift parameter associated with the dictionary of basis functions. In at least one embodiment, the separation engine may be configured to separate, within the transformed domain, a portion related to multiple diffractions.

A prediction engine 480 may include a combination of hardware and program instructions configured to predict, within the transformed domain and/or the time-space domain, a plurality of multiple diffractions based on the separated first and second portions, and/or based on a combination of one of the separated portions and the entirety of the transformed seismic data. In at least one embodiment, the prediction engine 480 is configured to predict the plurality of multiple diffractions based on the separated diffractive portion. In another embodiment, the prediction engine 480 may be configured to predict a multiplicity of multiple diffractions based on a combination of the transformed seismic data and the separated diffracted portion of the transformed seismic data. In at least one embodiment, the prediction engine may be configured to predict a multiplicity of multiple diffractions in the time-space domain. The prediction engine 480 may be configured to predict the plurality of multiple diffractions based on the separated diffractive portion after an inverse transform. In another embodiment, the prediction engine may be configured to predict the plurality of multiple diffractions based on a combination of the previously acquired seismic data and the inverse transformed diffracted portion.

A subtraction engine 483 may include a combination of hardware and program instructions configured to adaptively subtract the plurality of multiple diffractions from the previously acquired seismic data. In at least one embodiment, the subtraction engine operates on seismic data within the transformed domain. In other embodiments, the subtraction engine operates on seismic data within the time-space domain.

A synthesis engine 476 may include a combination of hardware and program instructions configured to inverse transform a particular seismic data set from the transformed domain to the time-space domain. A particular seismic data set can include a portion of the previously acquired seismic data set. For instance, the particular seismic data set can include a predicted plurality of multiple diffractions and/or a separated diffractive portion. In at least one embodiment, the transformed seismic data may include a predominantly reflective portion or predominantly diffractive portion of the transformed seismic data. The synthesis engine may be configured to output seismic data in the time-space domain at denser locations than the seismic data input to the analysis engine. In another embodiment, the transformed seismic data may include the predicted multiple diffractions. In yet another embodiment, the transformed seismic data may include the seismic data after suppression of multiple diffractions.

In at least one embodiment, the prediction engine is configured to predict, within the transformed domain, the plurality of multiple diffractions based on the separated predominantly diffractive portion, the synthesis engine is configured to inverse transform the predicted plurality of multiple diffractions, and the subtraction engine is configured to subtract, in the time-space domain, the inverse transformed multiple diffractions from the previously acquired seismic data.

In another embodiment, the synthesis engine is configured to inverse transform the separated predominantly diffractive portion, the prediction engine is configured to predict, within the time-space domain, the plurality of multiple diffractions based on the separated inverse-transformed diffractive portion, and the adaptive subtraction engine is configured to subtract, in the time-space domain, the inverse transformed predicted multiple diffractions from previously acquired seismic data.

In at least one embodiment, the prediction engine is configured to predict, within the transformed domain, the plurality of multiple diffractions based on the separated predominantly diffractive portion, the adaptive subtraction engine is configured to subtract, in the transformed domain, the predicted multiple diffractions from the transformed previously acquired seismic data, and the synthesis engine is configured to inverse transform the result to the time-space domain.

FIG. 5 illustrates a diagram of a machine 584 associated with prediction and subtraction of multiple diffractions. The machine 584 may utilize software, hardware, firmware, and/or logic to perform a plurality of functions. The machine 584 may be a combination of hardware and program instructions configured to perform a plurality of functions. The hardware, for example, may include a plurality of processing resources 586 and a plurality of memory resources 588, such as a machine-readable medium or other memory resources.

The memory resources 588 may be internal and/or external to the machine 584, for example, the machine 584 may include internal memory resources and have access to external memory resources. The program instructions, such as machine-readable instructions, may include instructions stored on the machine-readable medium to implement a particular function, for example, an action such as prediction and subtraction of multiple diffractions. The set of machine-readable instructions may be executable by one or more of the processing resources 586. The memory resources 588 may be coupled to the machine in a wired and/or wireless manner. For example, the memory resources 588 may be an internal memory, a portable memory, a portable disk, and/or a memory associated with another resource, for example, enabling machine-readable instructions to be transferred and/or executed across a network such as the Internet. As used herein, a "module" may include program instructions and/or hardware, but at least includes program instructions.

Memory resources may be non-transitory and may include volatile and/or non-volatile memory. Volatile memory may include memory that depends upon power to store information, such as various types of dynamic random access memory among others. Non-volatile memory may include memory that does not depend upon power to store information. Examples of non-volatile memory may include solid state reference media such as flash memory, electrically erasable programmable read-only memory, phase change random access memory, magnetic memory, optical memory, and/or a solid state drive, etc., as well as other types of non-transitory machine-readable media.

The processing resources 586 may be coupled to the memory resources via a communication path 590. The communication path 590 may be local or remote to the machine. Examples of a local communication path may include an electronic bus internal to a machine, where the memory resources 588 are in communication with the processing resources 586 via the electronic bus. Examples of such electronic buses may include Industry Standard Architecture, Peripheral Component Interconnect, Advanced Technology Attachment, Small Computer System Interface, Universal Serial Bus, among other types of electronic buses and variants thereof. The communication path 590 may be such that the memory resources are remote from the processing resources, such as in a network connection between the memory resources and the processing resources. That is, the communication path 590 may be a network connection. Examples of such a network connection may include a local area network, wide area network, personal area network, and the Internet, among others.

The machine-readable instructions stored in the memory resources 588 may be segmented into a plurality of modules 592, 587, 585 that when executed by the processing resources may perform a plurality of functions. As used herein, a module includes a set of instructions included to perform a particular task or action. The plurality of modules may be sub-modules of other modules. Each of the plurality of modules 592, 587, 585, 593 may include program instructions and/or a combination of hardware and program instructions that, when executed by a processing resource, may function as a corresponding engine.

An analysis module 592 may include instructions executable to transform previously acquired seismic data from a time-space domain to a transformed domain using a dictionary of basis functions. In at least one embodiment, the dictionary of basis functions comprises a transform dictionary composed of AASHRT functions. In another embodiment, the dictionary of basis functions comprises a transform dictionary composed of Green's functions for homogeneous media.

A separation module 587 may include instructions executable to separate, within the previously acquired seismic data, a reflective portion and a diffractive portion and predict a plurality of multiple diffractions based on the separated diffractive portion. Separation module 587 may also include instructions executable to separate the reflective portion and the diffractive portion based on an asymptote shift parameter associated with the dictionary of basis functions.

A synthesis module 585 may include instructions executable to inverse transform a particular seismic data set from the transformed domain to the time-space domain. In at least one embodiment, a subtraction module 593 may include instructions executable to adaptively subtract the inverse transformed particular seismic data set from the previously acquired seismic data.

Figure 6:
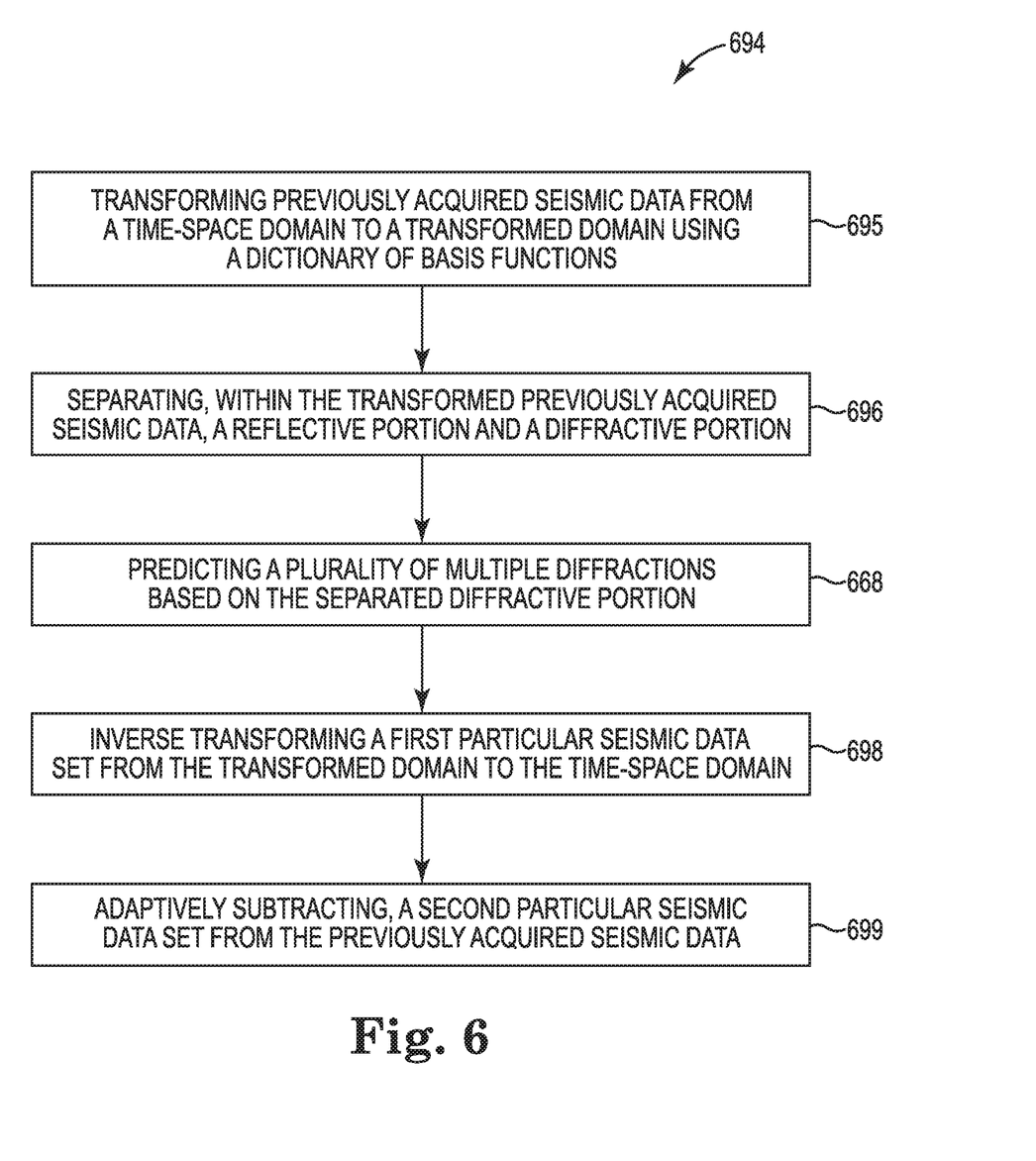
FIG. 6 illustrates a method flow diagram associated with prediction and subtraction of multiple diffractions.

FIGS. 6-9 illustrate method flow diagrams associated with prediction and subtraction of multiple diffractions. Elements illustrated in FIG. 6-9 may be performed in an order other than that presented in the Figures from top to bottom. FIG. 6 illustrates a method flow diagram 694 associated with prediction and subtraction of multiple diffractions. At 695, previously acquired seismic data may be transformed from a time-space domain to a transformed domain using a dictionary of basis functions. The dictionary may comprise a dictionary of AASHRT basis functions and a Green's function dictionary. At 696, a reflective portion and a diffractive portion may be separated within the previously acquired seismic data. The reflective portion may be predominantly reflective and the diffractive portion may be predominantly diffractive. In at least one embodiment, the predominantly reflective portion and the predominantly diffractive portion may be separated based on an asymptote shift parameter associated with the dictionary of AASHRT basis functions and a firing delay parameter associated with the Green's function dictionary.

At 668, a plurality of multiple diffractions may be predicted based on the separated diffractive portion. The prediction may occur within the transformed domain and/or within the time-space domain. In at least one embodiment, predicting the plurality of multiple diffractions within the time-space domain comprises predicting the plurality of multiple diffractions using a surface-related multiple elimination prediction based on a combination of the separated diffractive portion and the previously acquired seismic data.

The method may include, at 698, inverse transforming a first particular seismic data set from the transformed domain to the time-space domain. In at least one embodiment, inverse transforming the first particular seismic data set comprises inverse transforming the predicted plurality of multiple diffractions. In another embodiment, inverse transforming the first particular seismic data set comprises inverse transforming the separated diffractive portion. The separated diffractive portion may be inverse transformed such that the separated diffractive portion is synthesized at denser locations than the previously acquired seismic data. For example, the locations of the synthesis may be more compact than during acquisition of the seismic data.

At 699, a second particular seismic data set may be adaptively subtracted from previously acquired seismic data. The adaptive subtraction may occur within the transformed domain and/or within the time-space domain. For example, adaptively subtracting may include adaptively subtracting, within the transformed domain and/or the time-space domain the predicted multiple diffractions from the previously acquired seismic data. In at least one embodiment, the second particular seismic data set that is adaptively subtracted is a result of the inverse transforming. In another embodiment, the second particular seismic data set that is adaptively subtracted is a result of the predicting. In at least one embodiment, the method 694 can include conducting a marine survey to acquire seismic data and/or acquiring the seismic data from a third party.

Figure 7:
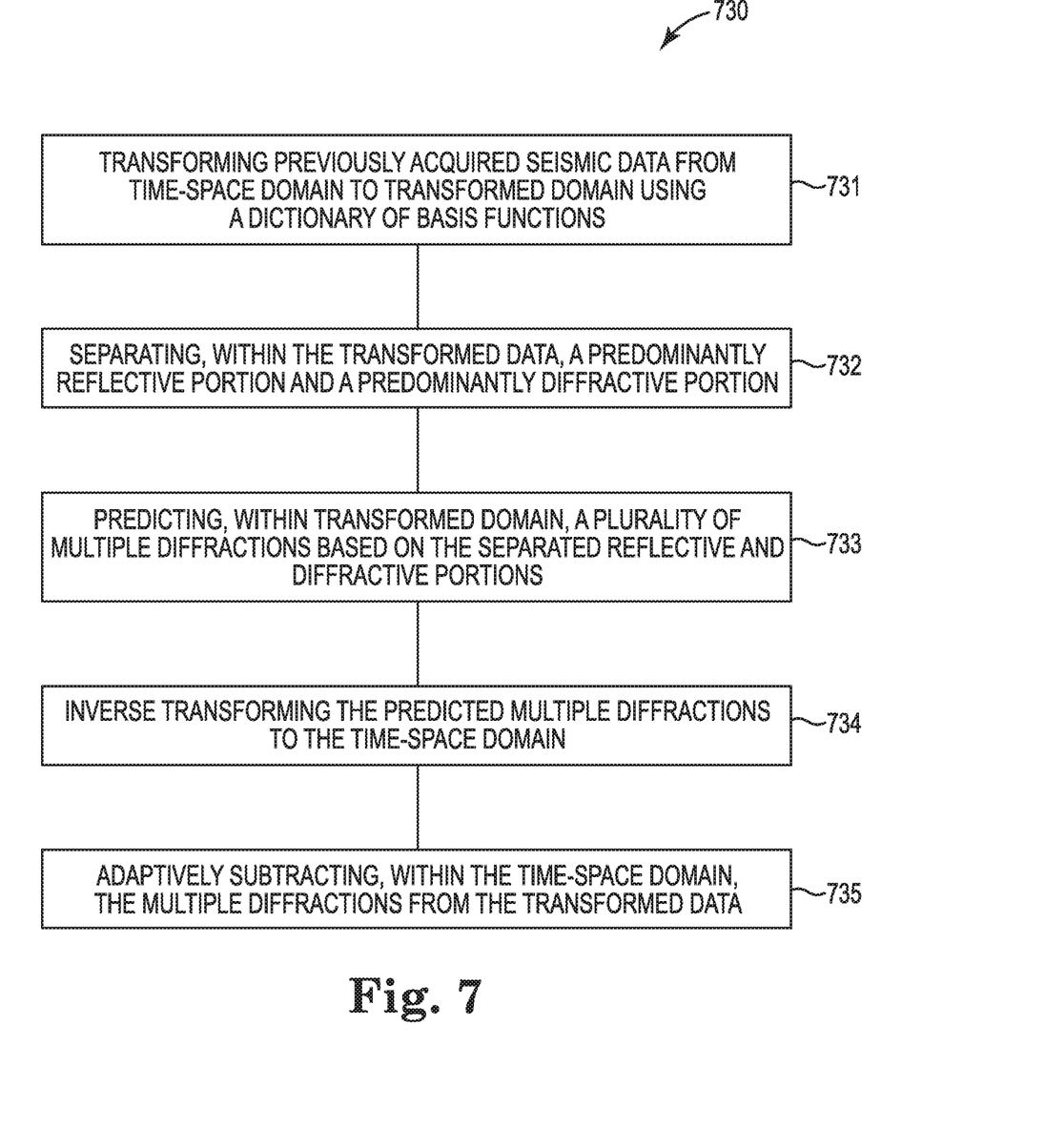
FIG. 7 illustrates a method flow diagram associated with prediction in a transformed domain and subtraction in a time-space domain.

FIG. 7 illustrates a method flow diagram 730 associated with prediction in a transformed domain and subtraction in a time-space domain. At 731, previously acquired seismic data is transformed from a time-space domain to a transformed domain using a dictionary of basis functions. The dictionary may comprise a dictionary of AASHRT basis functions and a Green's function dictionary.

At 732, a predominantly reflective portion and a predominantly diffractive portion are separated from within the transformed seismic data. In at least one embodiment, the predominantly reflective portion and the predominantly diffractive portion may be separated based on an asymptote shift parameter associated with the dictionary of AASHRT basis functions and a firing delay parameter associated with the Green's function dictionary.

At 733, a plurality of multiple diffractions is predicted within the transformed domain based on the separated reflective and diffractive portions. The predicted multiple diffractions may be inverse transformed to the time-space domain at 734, and the multiple diffractions may be adaptively subtracted within the time-space domain from the transformed seismic data at 735. In at least one embodiment, the method can include conducting a marine survey to acquire seismic data and/or acquiring the seismic data from a third party.

Figure 8:
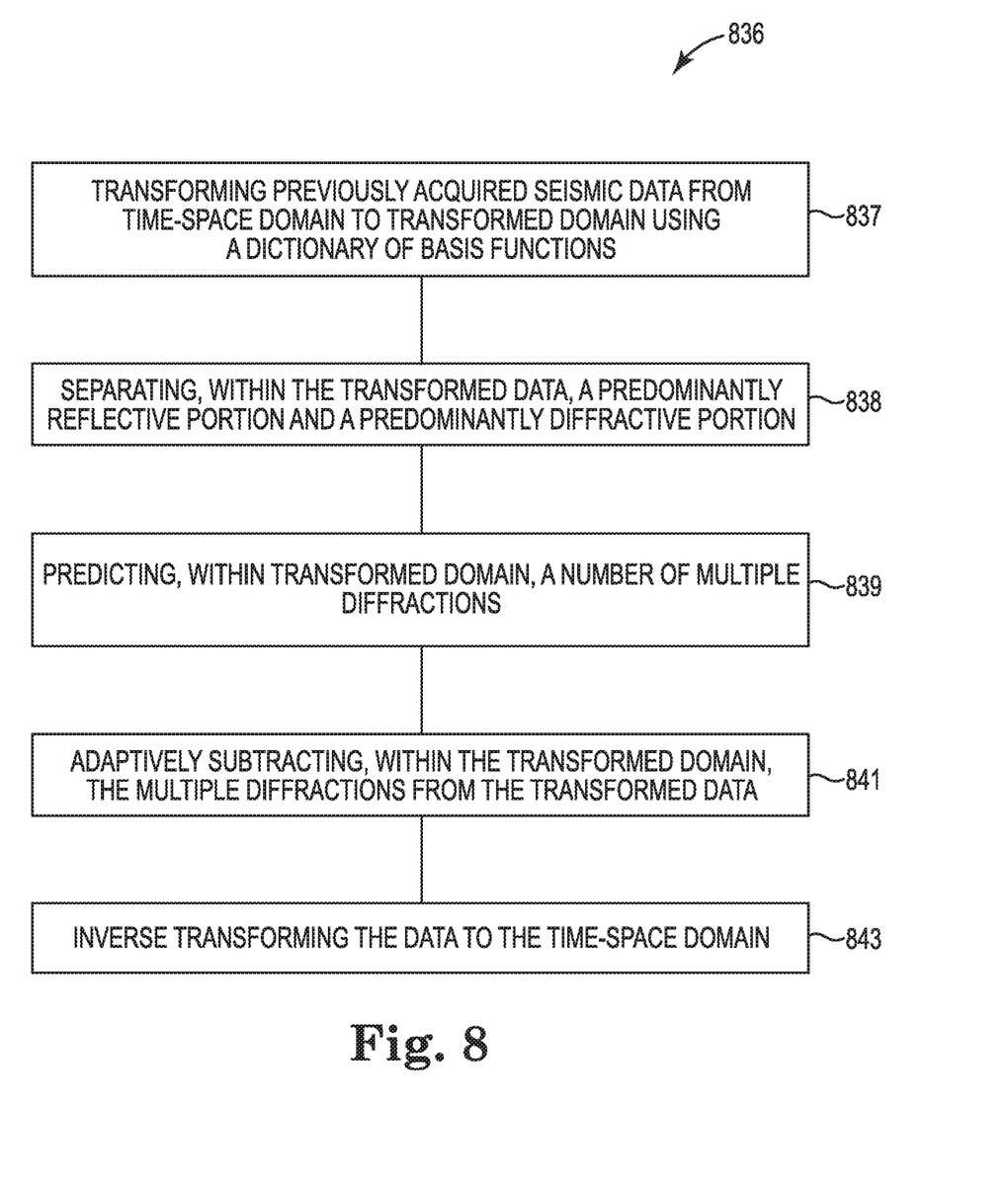
FIG. 8 illustrates a method flow diagram associated with prediction and subtraction in a transformed domain.

FIG. 8 illustrates a method flow diagram 836 associated with prediction and subtraction in a transformed domain. At 837, previously acquired seismic data from a time-space domain may be transformed to a transformed domain using a dictionary of basis functions. At 838, a predominantly reflective portion and a predominantly diffractive portion may be separated within the transformed seismic data. A plurality of multiple diffractions may be predicted within the transformed domain at 839, for example based on the separated predominantly reflective and predominantly diffractive portions. At 841, the multiple diffractions may be adaptively subtracted, within the transformed domain, from the transformed seismic data. The seismic data may be inverse transformed to the time-space domain at 843. In at least one embodiment, the method can include conducting a marine survey to acquire seismic data and/or acquiring the seismic data from a third party.

Figure 9:
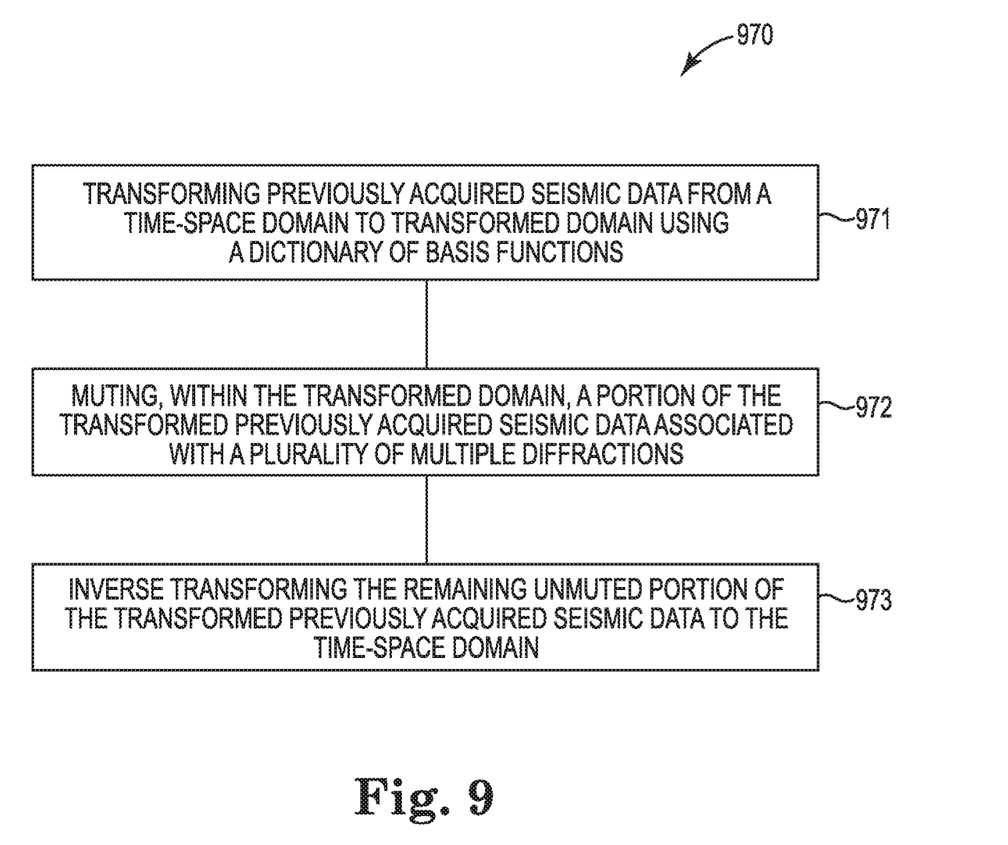
FIG. 9 illustrates a method flow diagram associated with multiple diffractions separable in a transformed domain.

FIG. 9 illustrates a method flow diagram 970 associated with multiple diffractions separable in a transformed domain. At 971, previously acquired seismic data may be transformed from a time-space domain to a transformed domain using a dictionary of basis functions. At 972, a portion of the transformed previously acquired seismic data associated with the plurality of multiple diffractions may be muted. The muting may be based on an equivalent source delay parameter and an asymptote shift parameter associated with the dictionary of basis functions in at least on embodiment.

The remaining unmuted portion of the transformed seismic data may be inverse transformed to the time-space domain at 973. For example, the remainder of the transformed seismic data may be the remainder of the transformed seismic data after the muting, such that the seismic data has multiple diffractions removed. In another embodiment, the multiple diffractions may be brought back and later subtracted from the input seismic data. Inverse transforming the remaining unmuted portion may include inverse transforming a primary associated with the transformed previously acquired seismic data in at least one embodiment. A primary, also called a primary reflection, can include a seismic wave that has been reflected only once before being detected by a seismic receiver, in contrast to a multiple reflection. In at least one embodiment, the method can include conducting a marine survey to acquire seismic data and/or acquiring the seismic data from a third party.

In accordance with a plurality of embodiments of the present disclosure, a geophysical data product may be produced. For instance, a geophysical data product may be generated from at least one of the previously acquired seismic data and the plurality of multiple diffractions. Geophysical data, such as data sampled by seismic receivers, depth sensors, location sensors, etc., may be obtained and stored on a non-transitory, tangible machine-readable medium. The geophysical data product may be recorded on a non-transitory machine-readable medium suitable for importing onshore. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis/processing may be performed on the geophysical data product. In some instances, geophysical analysis/processing may be performed on the geophysical data product offshore. For example, recorded seismic data may be treated according to the present disclosure as the recorded seismic data is sampled and/or measured offshore to facilitate other processing of the seismic data either offshore or onshore.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A system, comprising:
    means for removing multiple diffractions from acquired seismic data, comprising:
        means for transforming the acquired seismic data from a time-space domain to a transformed domain;
        means for separating, within the transformed domain, the acquired seismic data into a predominantly reflective portion and a predominantly diffractive portion;
        means for inverse transforming the separated predominantly diffractive portion;
        means for predicting, within the transformed domain, a plurality of multiple diffractions within the acquired seismic data based on the inverse transformation of the separated predominantly diffractive portion at denser spacing than the acquired seismic data; and
        means for adaptively subtracting, within the transformed domain, the predicted multiple diffractions from the acquired seismic data; and
    means for recording the seismic data with the multiple diffractions removed on a non-transitory machine-readable medium.

2. The system of claim 1, further comprising means for separating the seismic data into the predominantly reflective portion and the predominantly diffractive portion based on an asymptote shift parameter associated with a dictionary of asymptote- and apex-shifted hyperbolic radon transform (AASHRT) basis functions and a firing delay parameter associated with a dictionary of Green's functions.

3. The system of claim 2, further comprising means for separating the predominantly reflective portion and the predominantly diffractive portion based on an asymptote shift parameter associated with the dictionary of AASHRT basis functions and a firing delay parameter associated with the Green's function dictionary.

4. The system of claim 1, further comprising means for muting, within the transformed domain, a portion of the transformed seismic data.

5. The system of claim 1, further comprising means for inverse transforming the plurality of multiple diffractions.

6. The system of claim 1, further comprising means for inverse transforming results of the adaptive subtraction to the time-space domain.

7. The system of claim 1, wherein the denser locations are more compact with respect to one another as compared to the plurality locations during acquisition of the acquired seismic data.

8. The system of claim 1, wherein the means for generating seismic data with fewer multiple diffractions as compared to the acquired seismic data comprises generating seismic data with no multiple diffractions.

9. A method of manufacturing a geophysical data product, the method comprising:
    transforming previously acquired seismic data from a time-space domain to a transformed domain using a dictionary of basis functions;
    separating, within the transformed domain, the seismic data into a predominantly reflective portion and a predominantly diffractive portion;
    inverse transforming the separated predominantly diffractive portion;
    predicting, within the transformed domain, a plurality of multiple diffractions within the seismic data based on the inverse transformation of the separated predominantly diffractive portion at denser spacing than the previously acquired seismic data;
    muting, within the transformed domain, the plurality of multiple diffractions; and
    inverse transforming a remaining unmuted portion of the transformed previously acquired seismic data to the time-space domain.

10. The method of claim 9, further comprising muting the plurality of multiple diffractions based on an equivalent source delay parameter and an asymptote shift parameter associated with the dictionary of basis functions.

11. The method of claim 9, wherein inverse transforming the remaining unmuted portion comprises inverse transforming a primary associated with the transformed previously acquired seismic data.

12. The method of claim 9, further comprising:
generating the geophysical data product from at least one of the previously acquired seismic data and the plurality of multiple diffractions.

13. The method of claim 9, further comprising recording the geophysical data product on a non-transitory machine-readable medium.

14. The method of claim 9, further comprising processing the geophysical data product offshore or onshore.

15. The method of claim 9, further comprising generating seismic data with fewer multiple diffractions as compared to the previously acquired seismic data based on the inverse transforming of the remaining unmuted portion.

\* \* \* \* \*